United States Patent
Tamano

(10) Patent No.: US 9,933,549 B2
(45) Date of Patent: Apr. 3, 2018

(54) MICROSCOPE APPARATUS

(71) Applicant: OLYMPUS CORPORATION, Shibuya-ku, Tokyo (JP)

(72) Inventor: Shingo Tamano, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 14/823,425

(22) Filed: Aug. 11, 2015

(65) Prior Publication Data

US 2016/0054554 A1    Feb. 25, 2016

(30) Foreign Application Priority Data

Aug. 25, 2014   (JP) .................................. 2014-170499

(51) Int. Cl.
| | |
|---|---|
| G02B 21/00 | (2006.01) |
| G02B 3/08 | (2006.01) |
| G02B 21/02 | (2006.01) |
| G02B 21/06 | (2006.01) |
| G02B 21/16 | (2006.01) |

(52) U.S. Cl.
CPC ............. G02B 3/08 (2013.01); G02B 21/002 (2013.01); G02B 21/02 (2013.01); G02B 21/06 (2013.01); G02B 21/16 (2013.01)

(58) Field of Classification Search
CPC .......... G02B 3/08; G02B 21/16; G02B 21/06; G02B 21/02; G02B 21/002
USPC ..................... 359/363, 368, 379, 382, 639
See application file for complete search history.

(56) References Cited

U.S. PATENT DOCUMENTS

| | | | |
|---|---|---|---|
| 5,432,599 A | 7/1995 | Orii et al. | |
| 2012/0018651 A1* | 1/2012 | Hess | G01J 3/02 250/459.1 |
| 2012/0060920 A1* | 3/2012 | Fornari | B29D 11/00269 136/259 |

FOREIGN PATENT DOCUMENTS

| | | | |
|---|---|---|---|
| EP | 1830215 A1 * | 9/2007 | ......... G02B 21/0064 |
| JP | 06043028 A | 2/1994 | |
| JP | 11326605 A | 11/1999 | |
| JP | 2001264163 A | 9/2001 | |
| JP | 3268888 B2 | 3/2002 | |
| JP | 2007134835 A | 5/2007 | |
| JP | 4439071 B2 | 3/2010 | |
| JP | 2013156467 A | 8/2013 | |

OTHER PUBLICATIONS

"Optical Design using Fresnel Lenses",Arthur Davis and Frank Kuhnlenz; Optik & Photonik, Dec. 2007, No. 4.*
Arthur Davis and Frank Kuhnlenz, "Optical Design using Fresnel Lenses", Optik & Photonik, Dec. 2007, No. 4.*

* cited by examiner

*Primary Examiner* — Stephone B Allen
*Assistant Examiner* — Rahman Abdur
(74) *Attorney, Agent, or Firm* — Holtz, Holtz & Volek PC

(57) ABSTRACT

A microscope apparatus includes an objective and a photodetector, and projects a pupil of the objective onto a light-receiving surface of the photodetector. The microscope apparatus further includes an optical element that is arranged between the objective and the photodetector. The optical element has a plurality of refractive surfaces which are arranged in a direction orthogonal to an optical axis of the optical element and to which light fluxes emitted from the pupil of the objective at different angles are incident.

5 Claims, 8 Drawing Sheets

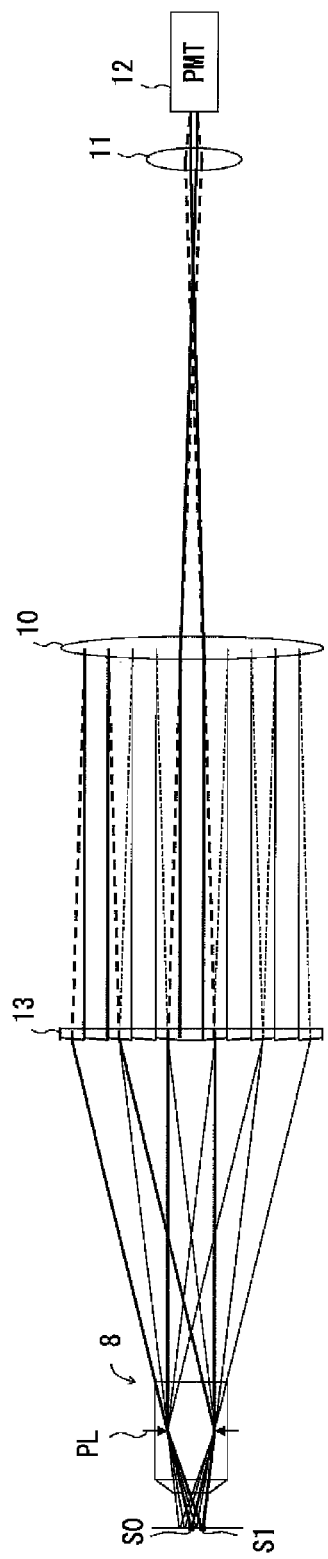
F I G. 6

MICROSCOPE APPARATUS

CROSS-REFERENCE TO RELATED APPLICATIONS

This application is based upon and claims the benefit of priority from prior Japanese Patent Application No. 2014-170499, filed on Aug. 25, 2014, the entire contents of which are incorporated herein by this reference.

BACKGROUND OF THE INVENTION

Field of the Invention

The present invention relates to a microscope apparatus, and more particularly, to a microscope apparatus including a photodetector having an angular characteristic.

Description of the Related Art

In recent years, the demand for observing deep portions of living tissue, such as the hippocampus of the brain of a living mouse or the like, has been increasing. Since living tissue is a strongly scattering medium, it is preferable to use a near infrared ray that has low invasiveness and a highly scattering transmittance for an observation of living tissue. Therefore, attention has been focused on a multi-photon excitation laser scanning microscope (hereinafter abbreviated to MPE-LSM) using a near infrared ray.

Even when living tissue is excited with a near infrared ray, fluorescence generated by the living tissue cannot be prevented from being scattered within the living tissue. Accordingly, for an MPE-LSM, various schemes for efficiently guiding fluorescence that scatters in a wide range within a living tissue to a photodetector are proposed.

For example, a scheme for increasing an effective diameter of an optical element such as an objective, a relay optics system, a filter or the like, arranged on a light path from a living tissue to a photodetector, so as to reduce a vignetting of an off-axis light beam is known. Moreover, Japanese Laid-open Patent Publication No. 2013-156467 discloses a technique for suppressing a vignetting of an off-axis light beam caused by a housing that accommodates a detection element.

SUMMARY OF THE INVENTION

One aspect of the present invention provides a microscope apparatus that has an objective and a photodetector, and projects a pupil of the objective onto a light-receiving surface of the photodetector. The apparatus includes an optical element that is arranged between the objective and the photodetector, and has a plurality of refractive surfaces which are arranged in a direction orthogonal to the optical axis of the optical element and to which light fluxes that are emitted from the pupil of the objective at different angles are incident. A refractive surface that is closer to the optical axis from among the plurality of refractive surfaces takes the shape of a linear line that forms a larger angle with the optical axis on a cross-section along the optical axis. A refractive surface on the optical axis from among the plurality of refractive surfaces is orthogonal to the optical axis.

Another aspect of the present invention provides a microscope apparatus including: an objective; a photodetector; an optical element that is arranged between the objective and the photodetector, and has a plurality of refractive surfaces which are arranged in a direction orthogonal to an optical axis of the optical element and to which light fluxes that are emitted from a pupil of the objective at different angles are incident; and a relay optics system that is arranged between the optical element and the photodetector, and projects the optical element onto a light-receiving surface of the photodetector. The plurality of refractive surfaces respectively convert incident light fluxes so that the light fluxes become close to parallel to the optical axis.

BRIEF DESCRIPTION OF THE DRAWINGS

The present invention will be more apparent from the following detailed description when the accompanying drawings are referenced.

FIG. 6 illustrates an example of an optical element where a pitch of refractive surfaces is smaller than a diameter of an incident light flux;

DESCRIPTION OF THE EMBODIMENTS

An off-axis light beam is incident to a pupil of an objective with an inclination relative to an optical axis. Accordingly, in an MPE-LSM that projects a pupil of an objective onto a light-receiving surface of a photodetector such as a photomultiplier tube (hereinafter abbreviated to PMT) or the like, the off-axis light beam is incident additionally to the light-receiving surface with an inclination relative to the optical axis. Moreover, the PMT has an angular characteristic (hereinafter referred to as an angular response), and exhibits a low detection efficiency for a light beam incident at a large beam angle. Accordingly, in the MPE-LSM, the detection efficiency of an off-axis light beam decreases.

In particular, a decrease in the detection efficiency of an off-axis light beam in an observation of deep portions is significant. The first reason is that fluorescence is diffused by being scattered in a wider range as a deeper portion of a living tissue is observed. As fluorescence is diffused in a wider range, the angle of a light beam when the off-axis light beam is incident increases. Therefore, additionally, the detection efficiency of the PMT decreases. The second reason is that an objective for an observation of deep portions generally has a characteristic such as a high NA (numerical aperture) and a low magnification, and normally has a pupil diameter ($=2 \cdot NA \cdot f$) larger than the size of the light-receiving surface of the PMT. In the MPE-LSM, the pupil of the objective is reduced and projected onto the light-receiving surface. Thus, the angle of a light beam when it is incident on the light-receiving surface is enlarged at 1/projection magnification (1/lateral magnification) in comparison with the angle of a light beam when it is incident on the pupil of the objective, so that the detection efficiency in the PMT is further decreased.

Accordingly, a technique for reducing the angle of a light beam when it is incident to the PMT is demanded to suppress a deterioration in the detection efficiency. By making a magnification with which the pupil of the objective is projected onto the light-receiving surface higher than that of conventional techniques when the PMT having a light-receiving surface of a larger size is used, the angle of a light beam incident to the light-receiving surface can be reduced. In this case, however, other problems such as an increase in the size of an apparatus, an increase in a manufacturing costs, and a difficulty in supporting multiple channels occur.

Embodiments according to the present invention are explained below in view of the above described description.

First Embodiment

Figure 1:
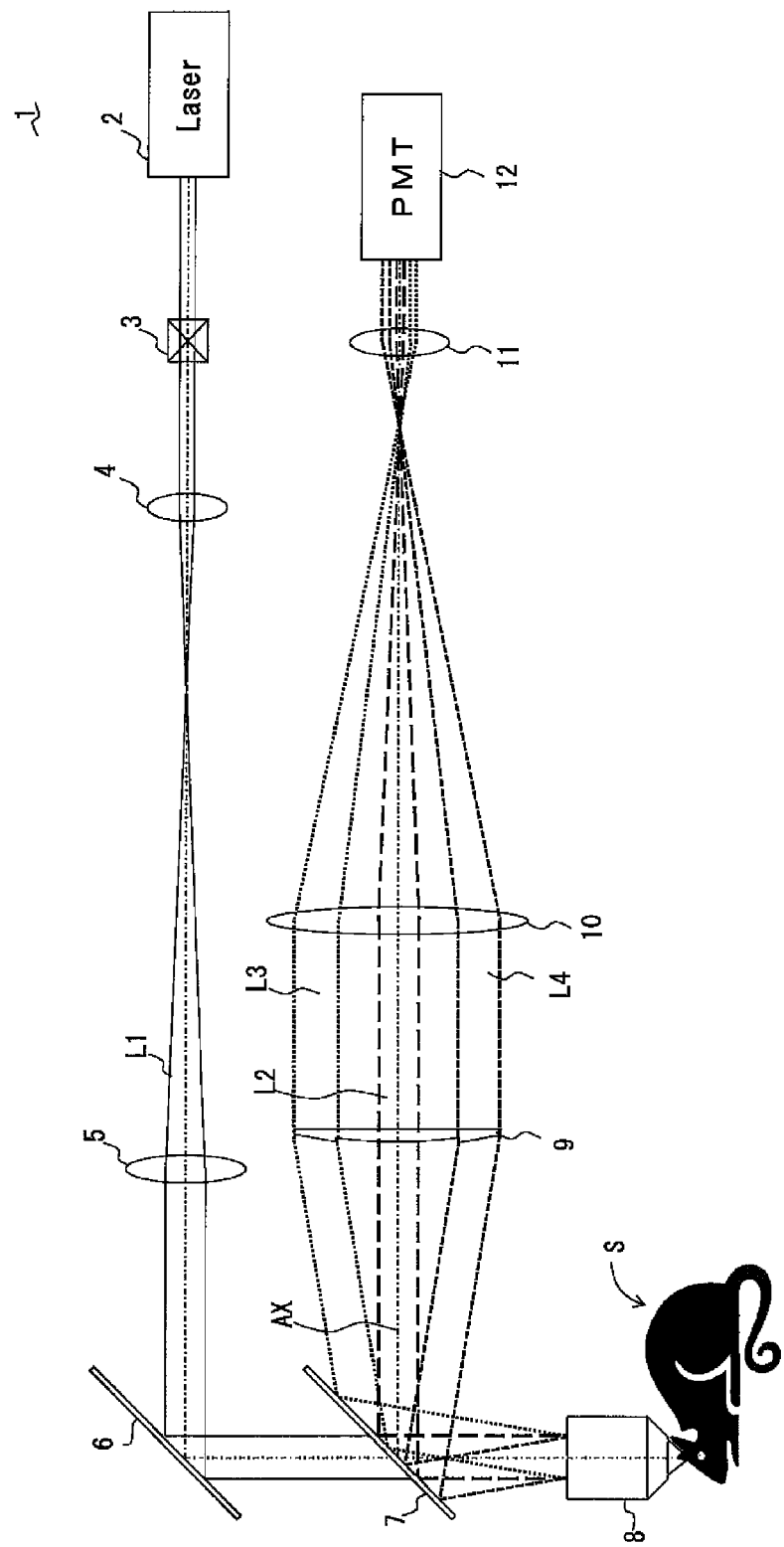
FIG. 1 illustrates an example of a configuration of a microscope apparatus according to a first embodiment.

FIG. 1 illustrates an example of a configuration of a microscope apparatus 1 according to a first embodiment. The microscope apparatus 1 is a multi-photon excitation laser scanning microscope, and is an upright microscope that observes a sample S put on a stage, not illustrated, from above. In the microscope apparatus 1, an epi-illumination is employed, and a laser beam L1, which is illumination light (excitation light), is irradiated onto the sample S via an objective 8 that captures fluorescence (an on-axis light flux L2, an off-axis light flux L3 and an off-axis light flux L4), which is detection light from the sample S. In FIG. 1, the laser beam L1 is represented with a solid line, and the on-axis light flux L2, the off-axis light flux L3 and the off-axis light flux L4 of the fluorescence are represented with a long-dashed line, a dotted line and a short-dashed line, respectively.

The microscope apparatus 1 is a scanning microscope that includes a galvano scanner 3 at a position optically conjugate with that of the pupil of the objective 8 on an illumination light path, and also includes the PMT 12 as a non-descan detector on a detection light path.

The microscope apparatus 1 includes, on the illumination light path, a laser 2 that emits the laser beam L1, which is a near infrared ray, the galvano scanner 3, which is scanning device for scanning the sample S with the laser beam L1, and a pupil projection lens 4 and a tube lens 5 that configure a relay optics system for relaying the pupil of the objective 8 to the galvano scanner 3. The microscope apparatus 1 further includes a mirror 6 that deflects the laser beam L1 in the direction of an optical axis of the objective 8, a dichroic mirror 7, which is a wavelength branching element that branches the light path of the laser beam L1 and that of the fluorescence (the on-axis light flux L2, the off-axis light flux L3 and the off-axis light flux L4) depending on a wavelength, and the objective 8. Note that the dichroic mirror 7 is a dichroic mirror that makes the laser beam L1 pass through and reflects the fluorescence.

The microscope apparatus 1 includes, on the detection light path, the objective 8, the dichroic mirror 7, an optical element 9, a relay lens 10 and a relay lens 11 that configure a relay optics system for projecting the optical element 9 onto the light-receiving surface of the PMT 12, and the PMT 12, which is a photodetector. Namely, in the microscope apparatus 1, these components function as a photodetecting device. The relay optics system composed of the relay lens 10 and the relay lens 11 has a relay magnification for reducing the optical element and for projecting the optical element 9 onto the light-receiving surface of the PMT 12. Moreover, the optical element 9 and the relay optics system are configured to project the pupil of the objective 8 onto the light-receiving surface of the PMT 12, and have a relay magnification for reducing the pupil of the objective 8 and for projecting the pupil onto the light-receiving surface of the PMT 12. Thus, the pupil of the objective 8 having the high NA and a low magnification is projected within the coverage of the light-receiving surface of the PMT 12.

In the microscope apparatus 1 configured as described above, the pupil of the objective 8 is relayed to the PMT 12. Therefore, fluorescence incident from an off-axis to the objective 8 can also be detected by the PMT 12 in addition to the fluorescence incident from an on-axis to the objective 8. Moreover, in the microscope apparatus 1, the optical element 9 is arranged between the objective 8 and the relay optics system (the relay lens 10 and the relay lens 11). Accordingly, not only the fluorescence incident from the on-axis to the objective 8 but also that incident from the off-axis to the objective 8 is incident to the light-receiving surface of the PMT 12 at an angle nearly parallel to the optical axis AX. This can suppress a deterioration in the detection efficiency due to the angular response of the PMT 12.

Figure 2:
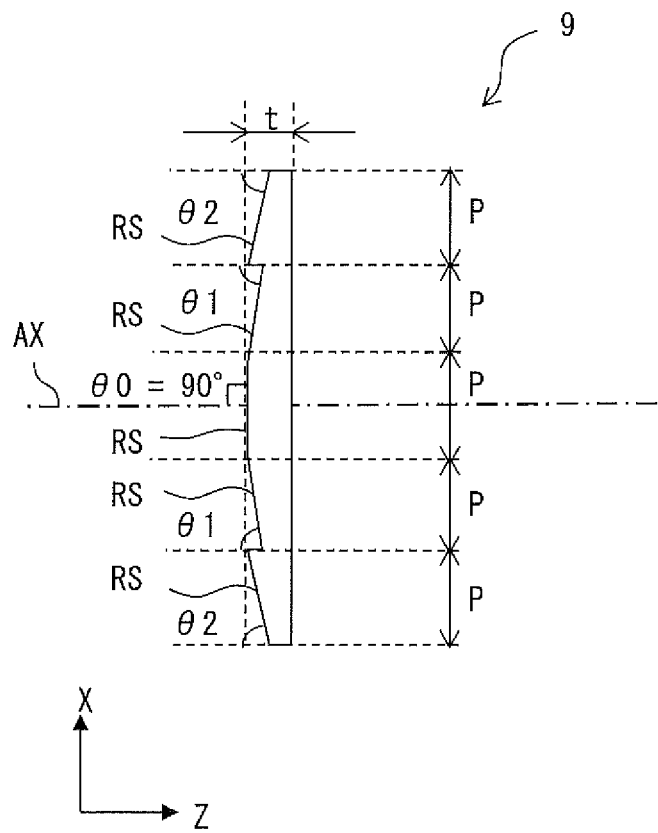
FIG. 2 is an explanatory diagram of a configuration of an optical element according to the first embodiment.
Figure 3:
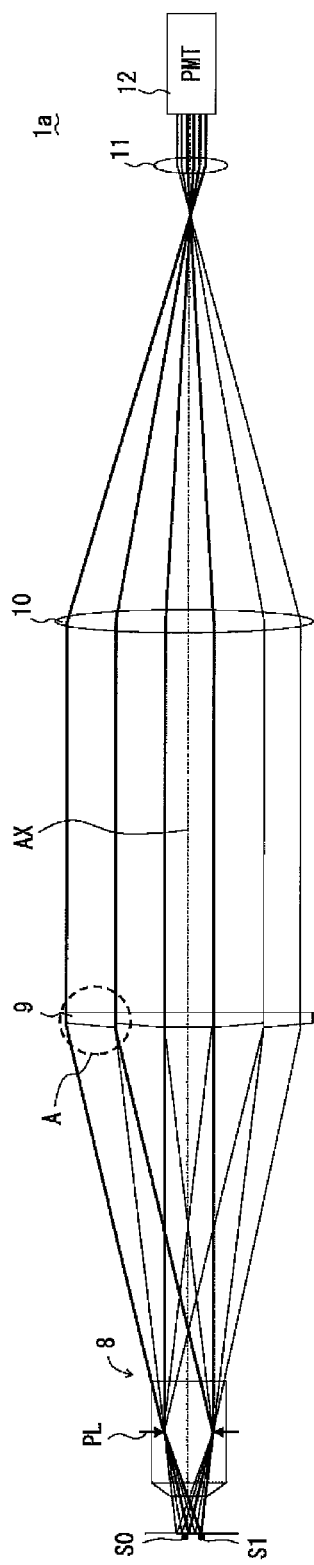
FIG. 3 illustrates an example of a configuration of a photodetecting device according to the first embodiment.

FIG. 2 is an explanatory diagram of a configuration of the optical element 9. FIG. 3 illustrates an example of a configuration of a photodetecting device 1a included in the microscope apparatus 1. An explanation of the suppression, by the optical element 9, of a decrease in the detection efficiency caused by the angular response without an increase in the size of the light-receiving surface of the PMT 12 is provided in detail below with reference to FIGS. 2 and 3.

The optical element 9 includes a first optical surface that is oriented toward the objective 8, and a second optical surface positioned on a side opposite to the first optical surface. The second optical surface is a flat surface orthogonal to the optical axis AX. In contrast, the first optical surface has a plurality of refractive surfaces RSes, which are arranged in a direction (such as an X direction illustrated in FIG. 2; hereinafter referred to as an orthogonal direction) orthogonal to the optical axis AX of the optical element 9 and to which light fluxes emitted from the pupil of the objective 8 at different angles are incident.

The plurality of refractive surfaces RSes are formed with a specified pitch P in the orthogonal direction. The pitch P (namely, a width of each of the plurality of refractive surfaces RSes in the orthogonal direction) is the diameter of a light flux when the light flux emitted from the pupil PL of the objective 8 as a parallel light flux is incident to the optical element 9. In the microscope apparatus 1, a parallel light flux emitted from the objective 8 is directly incident to the optical element 9. Therefore, the pitch P is the diameter of the pupil of the objective 8.

Additionally, the plurality of refractive surfaces RSes take the shape of a linear line that forms a different angle ($\theta0 \neq \theta1 \neq \theta2$) with the optical axis AX on a cross-section (such as an XZ cross-section) along the optical axis AX. A refractive surface RS that is closer to the optical axis AX from among the plurality of refractive surfaces RSes further inclines relative to the optical axis AX on the cross-section along the optical axis AX, and forms a larger angle ($\theta0 > \theta1 > \theta2$). A refractive surface RS on the optical axis AX is orthogonal to the optical axis AX (namely, $\theta 0=90°$). In FIG. 2, the optical element 9 is configured so that a maximum thickness t of areas in which a refractive surface RS is formed can become constant. Accordingly, in the optical element 9, a deeper groove is formed by a refractive surface RS as it is further separated from the optical axis AX.

The optical element 9 configured as described above respectively converts the light fluxes emitted from the pupil PL of the objective 8 at the different angles so that the light fluxes become close to parallel to the optical axis AX, and makes the converted light fluxes incident to the relay optics system. More specifically, a refractive surface that is further separated from the optical axis AX from among the plurality of refractive surfaces RSes further refracts an incident light flux (parallel light flux), and converts the incident light flux so that the light flux become close to parallel to the optical axis AX. Here, a parallel light beam emitted from the pupil P1 of the objective at a larger angle, namely, an off-axis light flux from an off-axis point (for example, a point S1) that is further separated from the optical axis AX is incident to a refractive surface RS that is further separated from the optical axis AX, and is refracted more. In contrast, a parallel light flux emitted from the pupil PL of the objective 8 in parallel to the optical axis AX, namely, an on-axis light flux generated at a point S0 on the optical axis AX is incident to a refractive surface RS on the optical axis AX, and passes through the optical element 9 without being refracted. Thus, both the on-axis light flux and the off-axis light flux that are emitted from the optical element 9 are incident to the relay optics system as parallel light fluxes nearly parallel to the optical axis AX. Therefore, they are also incident to the PMT 12 as light fluxes nearly parallel to the optical axis AX.

Accordingly, in the microscope apparatus 1, the optical element 9 reduces the beam angle of a light flux incident to the relay optics system, so that both an on-axis light flux and an off-axis light flux can be made incident to the PMT 12 at a small beam angle regardless of a reduction in the diameter of a light flux and an increase in the beam angle in the relay optics system. Thus, with the microscope apparatus 1, a brighter fluorescent image can be obtained by suppressing a decrease in the detection efficiency caused by the angular response of the PMT 12 without increasing the size of the light-receiving surface of the PMT 12.

Figure 4:
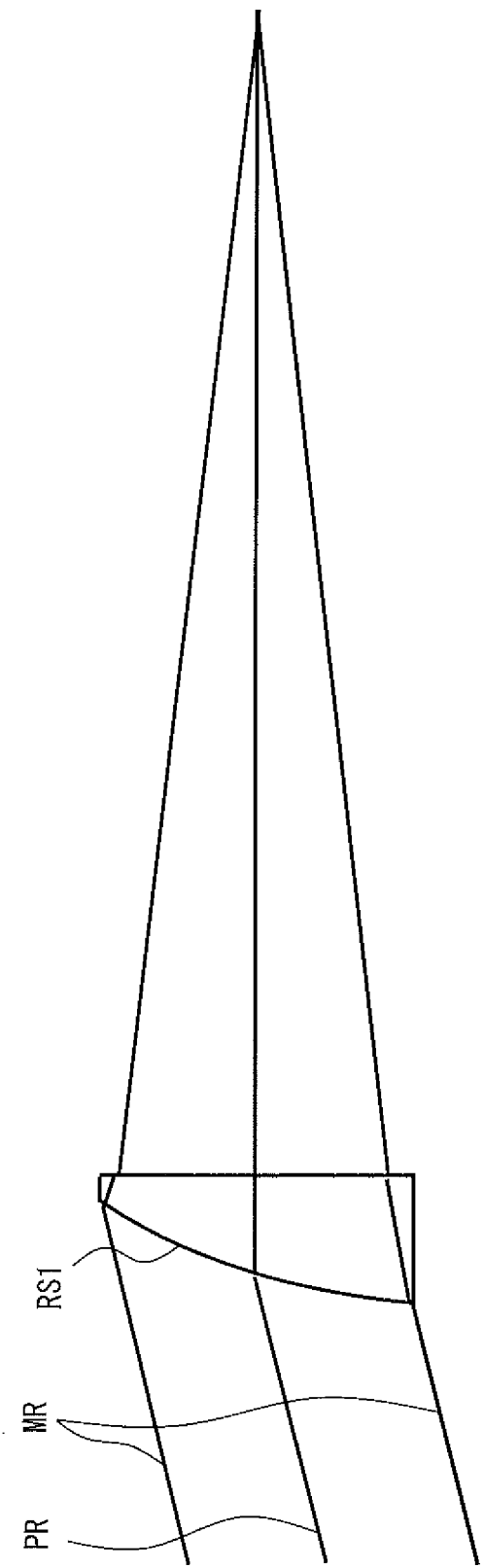
FIG. 4 is an enlarged view of an area A illustrated in FIG. 3 in a case in which a refractive surface of the optical element according to the first embodiment takes the shape of a sphere.
Figure 5:
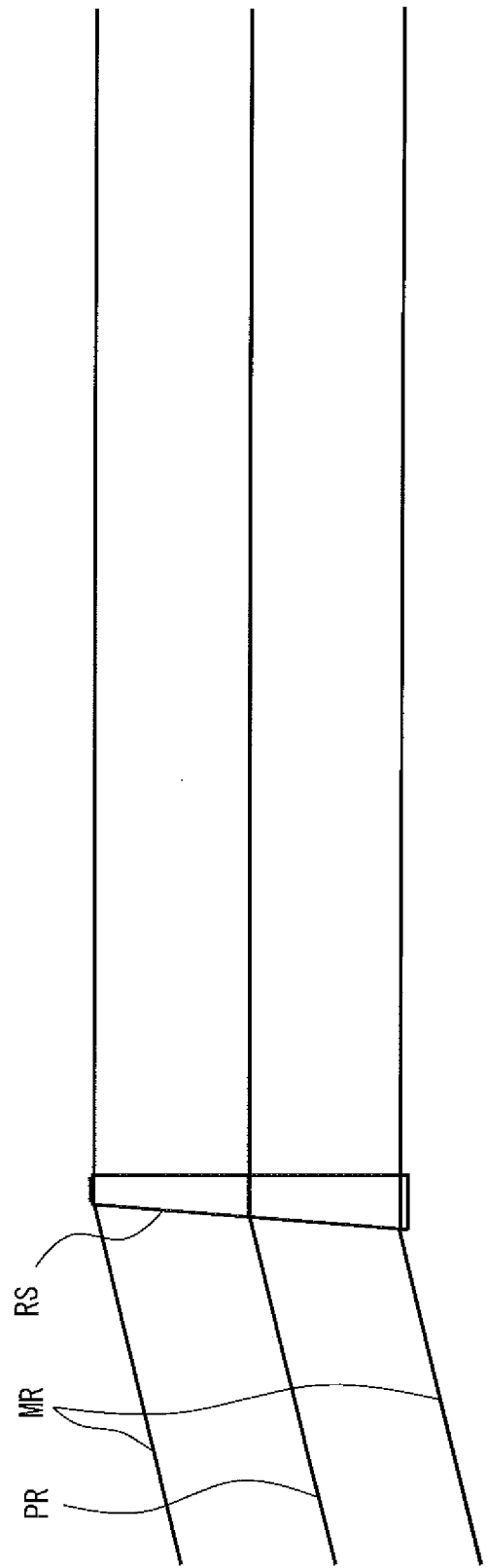
FIG. 5 is an enlarged view of the area A illustrated in FIG. 3 in a case in which the refractive surface of the optical element according to the first embodiment takes the shape of a linear line.

FIG. 4 is an enlarged view of an area A of the optical element 9 illustrated in FIG. 3 in a case where a refractive surface of the optical element 9 takes the shape of a sphere. FIG. 5 is an enlarged view of the area A of the optical element 9 illustrated in FIG. 3 in a case where the refractive surface of the optical element 9 takes the shape of a linear line. The reason that the refractive surface RS of the optical element 9 takes the shape of a linear line on a cross-section along the optical axis AX is described below with reference to FIGS. 4 and 5.

Assuming that the optical element 9 has a refractive surface RS1 taking the shape of a sphere as illustrated in FIG. 4, a principal ray PR and a marginal ray MR of an off-axis light flux incident to the refractive surface RS1 are incident to the refractive surface RS1 at different angles, and the off-axis light flux is converted from a parallel light flux into a converged light flux. In this case, the beam angle of the light flux incident from the refractive surface RS1 to the relay optics system fluctuates within the light flux, so that additionally the angle of the light beam incident to the PMT 12 fluctuates. This makes it difficult to suppress a decrease in the detection efficiency in the PMT 12.

In contrast, if the optical element 9 has the refractive surface RS taking the shape of a linear line as illustrated in FIG. 5, the principal ray PR and the marginal ray MR of the parallel light flux incident to the refractive surface RS are incident to the refractive surface RS at the same angle. Therefore, the parallel light flux is emitted from the optical element 9 as it is. In this case, the angle of the light beam incident from the refractive surface RS to the relay optics system is constant in the entire light flux. Accordingly, the light beam incident to the relay optics system is made nearly parallel to the optical axis AX by adjusting the angle of the refractive surface RS, whereby a decrease in the detection efficiency in the PMT 12 can be suppressed.

Namely, the reason why the refractive surface RS of the optical element 9 takes the shape of a linear line on the cross-section along the optical axis AX is to convert the angle of a light beam while keeping a parallel light flux by refracting at the same angle the parallel light flux incident to the same refractive surface RS regardless of the height of the light beam.

The case where the pitch P of the refractive surfaces RSes formed in the optical element 9 is the diameter of a light flux when the light flux emitted from the pupil PL of the objective 8 as a parallel light flux is incident to the optical element 9 has been described above as an example. However, it is desirable that the pitch P be equal to or larger than the diameter of a light flux when the light flux emitted from the pupil PL of the objective 8 as a parallel light flux is incident to the optical element 9. The reason is described with reference to FIG. 6. FIG. 6 illustrates an example of an optical element 13 where the pitch P of the refractive surface RS is smaller than the diameter of an incident light flux.

As illustrated in FIG. 6, if the pitch P of the refractive surface RS formed in the optical element 13 is smaller than the diameter of a light flux (the diameter of the pupil of the objective 8) when it is incident to the optical element 13, a parallel light flux emitted from the pupil PL of the objective 8 at the same angle is incident to a plurality of refractive surfaces RSes. FIG. 6 illustrates the example where the light flux is incident to three refractive surfaces. Accordingly, even though the refractive surfaces RSes take the shape of a linear line, portions of the parallel light that are emitted at the same angle and are incident to different refractive surfaces Rses are respectively emitted in different directions. Accordingly, the angles of light beams incident from the refractive surfaces RSes to the relay optics system fluctuate, so that additionally the angle of the light beams incident to the PMT 12 fluctuate.

In contrast, if the pitch P of the refractive surface RS formed in the optical element 9 is equal to or larger than the diameter of a light flux when it is incident to the optical element 9, the parallel light flux emitted from the pupil PL of the objective 8 at the same angle can be made incident to the same refractive surface RS. This can suppress the variation occurring the angles of light beams due to the phenomenon wherein the parallel light flux is incident to a plurality of refractive surfaces RSes. This can effectively suppress a decrease in the detection efficiency in the PMT 12.

It is desirable that the pitch be equal to or larger than the diameter of the light flux when the diameter of the light flux emitted from the pupil PL of the objective 8 as a parallel light flux is incident to the optical element 9. However, it is more desirable that the pitch P be closer to the diameter of the light flux. It is further desirable that the pitch P be equal to the diameter of the light flux. This is because a larger number of refractive surfaces RSes can be formed in the optical element 9 of a certain size by minimizing the pitch P on the condition that the pitch P is equal to or larger than the diameter of a light flux. Thus, a larger number of light fluxes among parallel light fluxes emitted from the pupil PL of the objective 8 at different angles can be converted into parallel light fluxes that are nearly parallel to the optical axis AX, and the converted light fluxes can be made incident to the relay optics system. This can further effectively suppress a decrease in the detection efficiency in the PMT 12.

Additionally, if the optical element 9 is forced to be positioned close to the objective 8 due to a spatial constraint, the plurality of refractive surfaces RSes may be formed with a pitch P smaller than the diameter of a light flux. As illustrated in FIGS. 3 and 6, parallel light fluxes emitted from the pupil PL at different angles increasingly overlap as the optical element 9 becomes positioned closer to the objective 8, so that light fluxes at significantly different angles are incident to the same refractive surface. When the light fluxes at significantly different angles are incident to one refractive surface, additionally the angles of light fluxes emitted from the refractive surface largely fluctuate. Accordingly, even though a plurality of light fluxes are incident to one refractive surface, it is desirable to reduce a difference among the angles of the light fluxes to a minimum. By reducing the pitch P, the difference among the angles of light fluxes incident to one refractive surface can be reduced. In view of the above explanation, the plurality of refractive surfaces RSes may be formed with a pitch P according to the distance between the objective 8 and the optical element 9.

Second Embodiment

Figure 7:
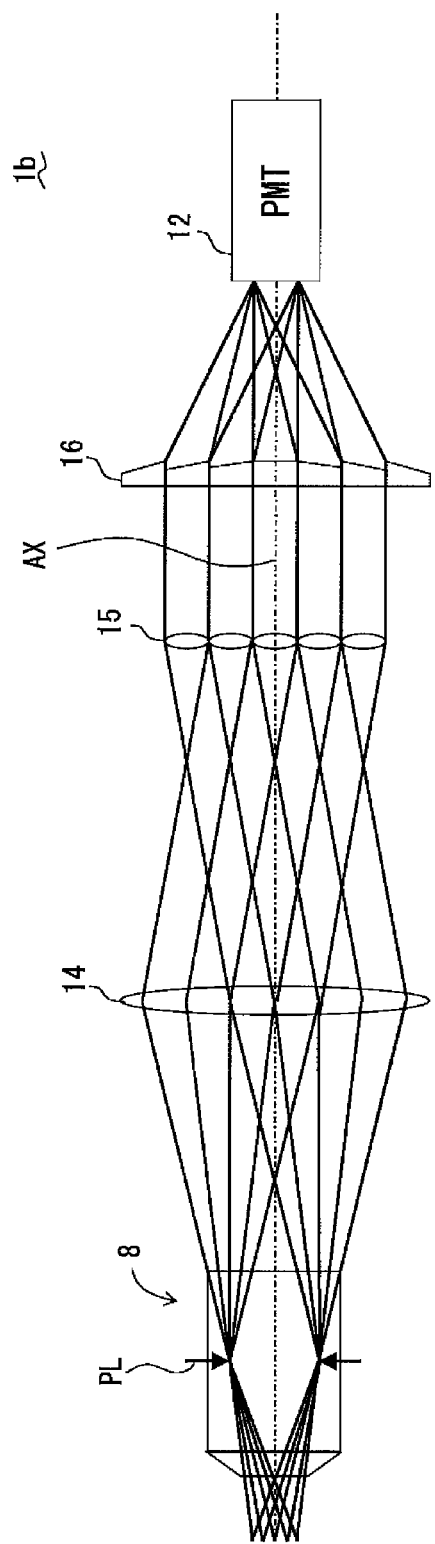
FIG. 7 illustrates a configuration of a photodetecting device according to a second embodiment.

A microscope apparatus according to this embodiment is different from the microscope apparatus 1 according to the first embodiment illustrated in FIG. 1 in that the microscope apparatus includes a photodetecting device 1b illustrated in FIG. 7 as a replacement for the photodetecting device 1a illustrated in FIG. 3. Other components are the same as those of the microscope apparatus 1.

The photodetecting device 1b illustrated in FIG. 7 includes, in order from the side closer to the objective 8, a relay optics system composed of a tube lens 14 and a fly-eye lens 15, an optical element 16 and the PMT 12. The relay optics system and the optical element 16 are configured to project the pupil PL of the objective 8 onto the light-receiving surface of the PMT 12. The optical element 16 is the same as the optical element 9 illustrated in FIG. 3, and is arranged so that a plurality of refractive surfaces RSes can be oriented toward the side of the PMT 12.

The relay optics system composed of the tube lens 14 and the fly-eye lens 15 is arranged between the objective 8 and the optical element 16, and is configured to project the pupil PL of the objective 8 onto the optical element 16. The fly-eye lens 15 includes a plurality of lens elements which are arranged in a direction orthogonal to the optical axis AX, and the diameters of the lens elements are almost the same as the pitch P of the refractive surfaces RSes formed in the optical element 16.

In the photodetecting device 1b, parallel light fluxes emitted from the pupil PL of the objective 8 at different angles are condensed by the tube lens 14 (namely, an intermediate image is formed), and are incident respectively to the lens elements of the fly-eye lens 15 thereafter. Then, the parallel light fluxes are converted by the lens elements of the fly-eye lens 15 into parallel light fluxes that are nearly parallel to the optical axis AX, and are emitted from the relay optics system. As a result, the plurality of parallel light fluxes emitted from the pupil PL of the objective 8 at the different angles are emitted from different positions in the direction orthogonal to the optical axis AX as parallel light fluxes that are nearly parallel to the optical axis AX.

The optical element 16 plays a role in refracting each of the plurality of parallel light fluxes lying in the direction orthogonal to the optical axis AX at a different refractive surface, and in overlaying and irradiating the light fluxes onto the light-receiving surface of the PMT 12.

In the microscope apparatus including the photodetecting device 1b configured as described above, the pupil of the objective 8 is relayed to the PMT 12. Therefore, similarly to the microscope apparatus 1, additionally fluorescence incident from an off-axis to the objective 8 can be detected by the PMT 12 in addition to fluorescence incident from an on-axis to the objective 8. Moreover, parallel light fluxes that are nearly parallel to the optical axis AX and are converted by the lens elements of the fly-eye lens 15 can be overlaid and irradiated onto the same area of the light-receiving surface of the PMT 12 using the optical element 16. Accordingly, the size of the light-receiving surface of the PMT 12 can be reduced almost to the diameter of the lens elements of the fly-eye lens 15. Moreover, a distance between the optical element 16 and the PMT 12 is lengthened, and the angle of a refractive surface RS is adjusted in accordance with the distance, whereby additionally an angle at which an off-axis light flux incident to the PMT 12 can be reduced.

Accordingly, with the microscope apparatus according to this embodiment, a decrease in the detection efficiency caused by the angular response of the PMT 12 can be suppressed without increasing the size of the light-receiving surface of the PMT 12, similarly to the microscope apparatus 1 according to the first embodiment.

Third Embodiment

Figure 8:
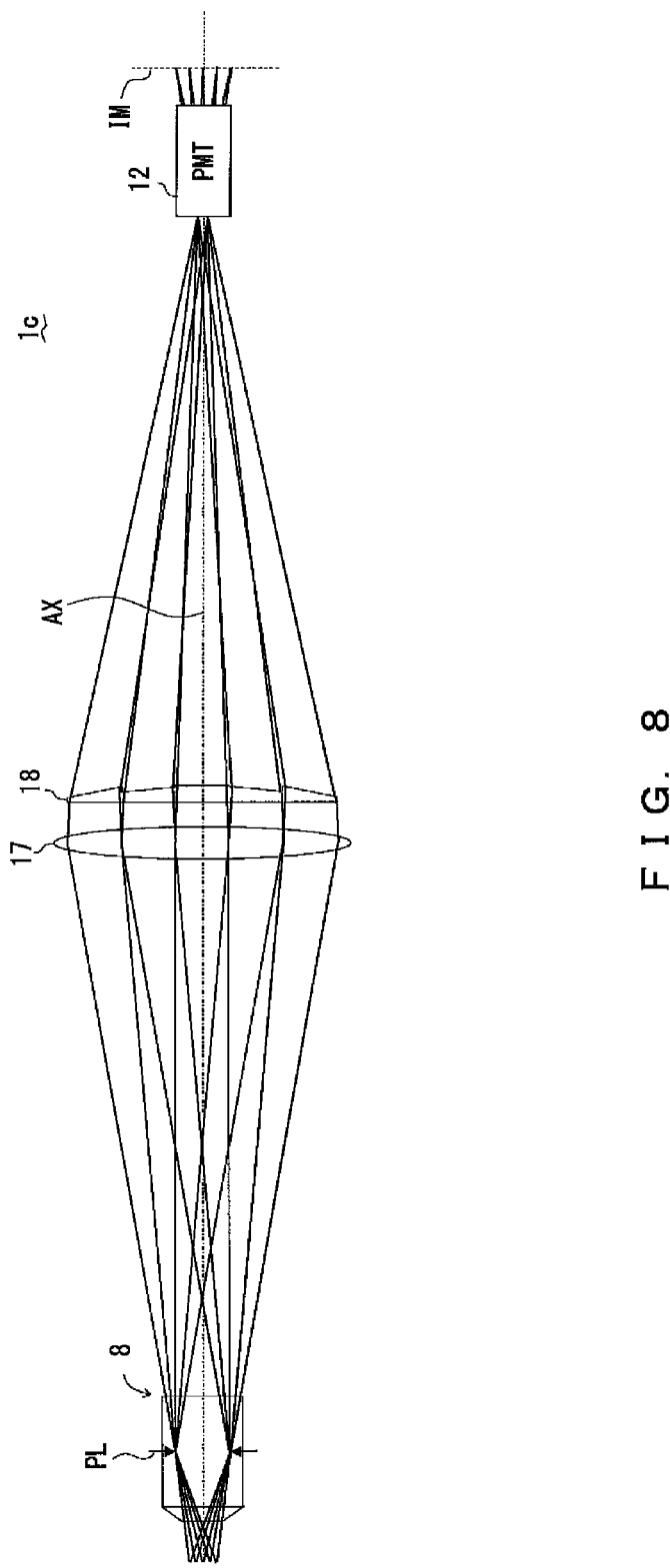
FIG. 8 illustrates a configuration of a photodetecting device according to a third embodiment.

A microscope apparatus according to this embodiment is different from the microscope apparatus 1 according to the first embodiment illustrated in FIG. 1 in that the microscope apparatus includes a photodetecting device 1c illustrated in FIG. 8 as a replacement for the photodetecting device 1a illustrated in FIG. 3. Other components are the same as those of the microscope apparatus 1.

The photodetecting device 1c illustrated in FIG. 8 includes, in order from the side closer to the objective 8, a tube lens 17, an optical element 18, and the PMT 12. The tube lens 17 is a lens that converges a parallel light flux emitted from the pupil PL of the objective 8, and has a long focal length. The optical element 18 is the same as the optical element 9 illustrated in FIG. 3, and is arranged so that a plurality of refractive surfaces RSes can be oriented toward the side of the PMT 12. The PMT 12 is arranged between the optical element 18 and a rear focal plane (imaging plane IM) of the tube lens 17.

In the photodetecting device 1c, parallel light fluxes emitted from the pupil PL of the objective 8 at different angles are converted by the tube lens 17 into converged light fluxes that are nearly parallel to the optical axis AX. Since the tube lens 17 has a long focal length, the converged light fluxes are emitted from the tube lens 17 with a small emission NA, and are incident to the refractive surfaces RSes of the optical element 18 thereafter.

The optical element 18 plays a role in refracting the plurality of converged light fluxes lying in the direction orthogonal to the optical axis AX on the different RSes, and in overlaying and irradiating the light fluxes onto the light-receiving surface of the PMT 12 positioned prior to the rear focal plane of the tube lens 17. Thus, the pupil PL of the objective 8 is projected onto the light-receiving surface of the PMT 12 by the tube lens 17 and the optical element 18.

In the microscope apparatus including the photodetecting device 1c configured as described above, the pupil of the objective 8 is relayed to the PMT 12. Accordingly, fluorescence incident from an off-axis to the objective 8 can be detected by the PMT 12 in addition to fluorescence incident from an on-axis to the objective 8. Moreover, parallel light fluxes that are nearly parallel to the optical axis AX and converted by the tube lens 17 can be overlaid and irradiated by the optical element 18 onto the same area of the light-receiving surface of the PMT 12. Accordingly, the size of the light-receiving surface of the PMT 12 can be made smaller than the effective diameter of the tube lens 17. Additionally, the angle of a refractive surface RS is adjusted by using the tube lens 17 having a long focal length and by depending on the focal length, whereby additionally an angle at which an off-axis light flux is incident to the PMT 12 can be reduced. Note that the focal length of the tube lens 17 may be lengthened to an area where there is almost no influence of the angular response of the PMT 12 (namely, where a difference in the detection efficiency depending on an angle is small).

Accordingly, with the microscope apparatus according to this embodiment, a decrease in the detection efficiency caused by the angular response of the PMT 12 can be suppressed without increasing the size of the light-receiving surface of the PMT 12, similarly to the microscope apparatus 1 according to the first embodiment and the microscope apparatus 2 according to the second embodiment.

The above described embodiments refer to specific examples for ease of understanding of the invention. However, the present invention is not limited to these embodiments. The microscope apparatuses can be diversely modified and changed within a scope that does not depart from the concept of the present invention stipulated by the claims. For example, a single embodiment can be implemented by combining some of the features disclosed in the contexts of the individual embodiments described in this specification.

The embodiments refer to the examples where light is detected by the single PMT 12. However, a wavelength branching element that branches a light path depending on a wavelength, such as a dichroic mirror, may be arranged prior to the PMT 12, and a PMT is additionally provided on the branched light path. Since the embodiments are configured so that both an off-axis light flux and an on-axis flux light can be incident to the PMT 12 at a small beam angle, favorable wavelength separation can be performed, and multiple channels can be easily implemented with the above described modification.

What is claimed is:

1. A microscope apparatus comprising:
an objective;
a photodetector having a light-receiving surface, the microscope apparatus projecting a pupil of the objective onto the light-receiving surface of the photodetector; and
an optical element that is arranged between the objective and the photodetector, the optical element having a plurality of refractive surfaces which are arranged in a direction orthogonal to an optical axis of the optical element and to which light fluxes emitted from the pupil of the objective at different angles are incident,
wherein a refractive surface that is closer to the optical axis from among the plurality of refractive surfaces takes the shape of a linear line that forms a larger angle with the optical axis on a cross-section along the optical axis, and a refractive surface on the optical axis from among the plurality of refractive surfaces is orthogonal to the optical axis,
wherein the plurality of refractive surfaces are formed with a specified pitch in the direction orthogonal to the optical axis, the specified pitch being equal to a diameter of one light flux when the one light flux is incident to the optical element, and the one light flux being one of a plurality of light fluxes emitted from the pupil of the objective as parallel light fluxes, and
wherein the one light flux incident to the optical element and a light flux emitted from the optical element are each parallel light fluxes on the cross-section along the optical axis.

2. The microscope apparatus according to claim 1, further comprising a relay optics system that is arranged between the optical element and the photodetector, and that projects the optical element onto the light-receiving surface of the photodetector,
wherein the optical element respectively converts the light fluxes emitted from the pupil of the objective at the different angles so that the light fluxes become substantially parallel to the optical axis, and makes the converted light fluxes incident to the relay optics system.

3. The microscope apparatus according to claim 1, further comprising a relay optics system that is arranged between the objective and the optical element, and that projects the pupil of the objective onto the optical element,
wherein the relay optics system respectively makes the light fluxes emitted from the pupil of the objective at the different angles incident to different refractive surfaces of the optical element.

4. The microscope apparatus according to claim 3, wherein the relay optics system is composed of a tube lens and a fly-eye lens.

5. The microscope apparatus according to claim 1, wherein one light flux of the plurality of light fluxes is a light flux emitted from a focal position on an optical axis of the objective.

* * * * *